Figure 1:
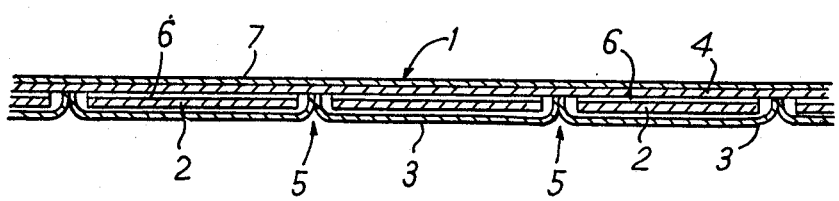

United States Patent [19]

Healiss

[11] 4,023,651
[45] May 17, 1977

[54] DAMPING VIBRATIONS IN SHEET MATERIAL

[75] Inventor: Kenneth Healiss, Melton Mowbray, England

[73] Assignee: The Production Engineering Research Association, Melton Mowbray, England

[22] Filed: Apr. 30, 1975

[21] Appl. No.: 573,098

Related U.S. Application Data

[63] Continuation-in-part of Ser. No. 452,141, March 18, 1974, abandoned.

[30] Foreign Application Priority Data

Mar. 31, 1973 United Kingdom ............. 15609/73
Mar. 20, 1975 United Kingdom ............. 11545/75

[52] U.S. Cl. ............................ 188/1 B; 181/33 GA
[51] Int. Cl.² ............................................. F16F 7/08
[58] Field of Search ............... 161/213; 181/33 GA; 188/1 B

[56] References Cited

UNITED STATES PATENTS

| 650,290 | 5/1900 | Wirt | 181/33 A UX |
| 3,124,501 | 3/1964 | Wise | 181/33 GA |
| 3,243,374 | 3/1966 | Gillard | 181/33 G X |
| 3,345,884 | 10/1967 | Kuderko | 188/1 B X |
| 3,399,103 | 8/1968 | Salyer et al. | 188/1 B UX |
| 3,817,356 | 6/1974 | Dahlquist | 188/1 B |

*Primary Examiner*—Duane A. Reger
*Attorney, Agent, or Firm*—Darby & Darby

[57] ABSTRACT

A method of and flexible vibration damping pad for damping vibrations in sheet material during working or handling of the sheet material, the pad including vibration damping material portions on one face thereof which are fixedly located against permanent magnet means which releasably secure the vibration damping material to the sheet material during working or handling.

17 Claims, 2 Drawing Figures

DAMPING VIBRATIONS IN SHEET MATERIAL

This application is a continuation-in-part of my prior, co-pending application Ser. No. 452,141 filed Mar. 18, 1974, now abandoned.

This invention relates to the damping of vibrations in sheet material, for example sheet metal, during handling.

As is well known, the handling of sheet metal, particularly where large unsupported areas are involved, produces vibration problems. Moreover, vibrations resulting from impacts and other forms of excitation produce noise having its major spectral constituents within the range to which the human ear is most sensitive. This not only makes for difficult working conditions but in extreme cases can damage the hearing of persons subjected thereto.

It is known to damp vibrations in finished sheet metal components, by permanently glueing a damping material thereto, or by spraying a damping material on to a component to be damped. This expedient is adopted, for example, to damp virbrations in the finished doors, bonnets or other body components, of motor vehicles. However it is not practical to damp vibrations in plain metal sheets or partly finished sheet metal components in this way since the damping material hinders finishing of the metal components.

A typical example of an environment in which vibration in sheet metal causes problems is in the motor vehicle industry where car bodies and body components have to be provided with holes, rivets etc., and transferred from station to station on any assembly line.

In accordance with the present invention there is provided a method of damping vibrations in sheet material during working or handling comprising the steps of attaching a substantially flexible vibration damping pad having a vibration damping material at one face thereof to the sheet material the pad including permanent magnet means by which the pad is releasably held to the sheet material, and removing said pad from said sheet material.

The invention also provides a flexible vibration damping pad for damping vibrations in sheet material during working or handling comprising a vibration damping material portions of one face of which are fixedly located against permanent magnet means, said permanent magnet means being arranged to releasably secure the vibration damping material to the sheet material during working or handling to enable the pad to be removed subsequent to said working or handling.

Where the sheet is a magnetically-responsive metal, the vibration damping material will be secured simply by the magnetic attraction between the damping material and metal sheet. In the case of non-magnetic sheets, the damping material may be secured by providing a magnetically-responsive backing at the side of the sheet opposite to the damping means.

As will be appreciated, the method provided by the invention can be used to obviate the problems produced by virbrations in plain metal sheets and partly finished sheet metal components during handling thereof. Thus, the damping means of the invention can be easily and quickly applied in any problem situation. Moreover, the damping material is readily removable on completion of the component and can subsequently be re-used.

The force exerted by the permanent magnet means must be sufficient to hold the sound damping material in place during handling of the sheet material or component in question, and in some cases whilst the operations are performed thereon. This force can be increased where necessary by using magnetically-responsive metal backing materials.

Normally the vibration damping material will be in sheet or strip form. In mass producing industries the material may be shaped to provide "tailor made" vibration damping covers or aprons for use on standard sheet metal components.

The permanent magnet means may be incorporated in the vibration damping material but will normally be applied externally. Preferably, a laminate will be formed between a sheet of vibration damping material and a complementary flexible permanent magnetic sheet. The last mentioned sheet may be of rubber or a plastics material containing ferrite particles or pieces of magnetic material and be bonded to the vibration damping material.

Figure 2:
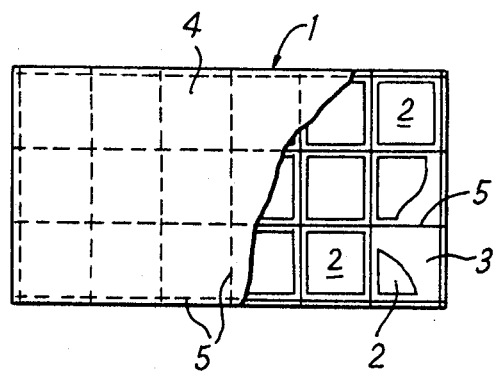

The invention will now be described further by way of example with reference to the accompanying drawings in which:

FIG. 1 is a sectional elevation through a vibration damping pad in accordance with one aspect of the invention and FIG. 2 is a partly cut-away view of the vibration damping pad shown in FIG. 1.

A flexible vibration damping pad in accordance with the invention is shown generally as 1. The pad includes a flexible base sheet which, in the illustrated embodiment, is of a woven fabric 4 having a vinyl backing 7. A facing sheet 3, in combination with the base sheet defines a plurality of magnet-receiving pockets. The facing sheet 3 is preferably of cotton or other natural fibre since, generally speaking, natural fibres have a higher coefficient of friction than synthetic fibres and are thus less likely to slide relative to a surface to which the pad is to be fixed.

The pocket sheet or laminate is assembled by sewing, adhesion, rivets, staples or other form of fastener to the base sheet at a plurality of spaced locations 5. A flexible magnet 2 is received in each pocket. The magnets are of a rubber or plastics material containing ferrite particles or pieces of magnetic material and it has been found that the magnetic material sold by Messrs. James Neill (Naper Street) Limited under the tradename BONDED FEROBA "A" is particularly suitable. A steel shim 6 is magnetically secured to each magnet 2 at the side adjacent the base sheet the steel shims 6 helping to improve the magnetic properties of the magnets 2 in known manner.

As has been outlined hereinabove the vibration damping pad in accordance with the invention is intended for use in environments where comparatively large unsupported areas of sheet material are to be handled, such for example, as in a motor vehicle assembly plant. The pad may be releasably attached to a surface of the sheet material to be damped and removed therefrom subsequent to assembly of the sheet material in a motor vehicle so that the pad may be then reused during assembly of a further vehicle.

Where the sheet material is not of a magnetically-responsive material the pad may be placed in position against the sheet material and held there by an additional magnet or magnets placed on the remote side of the sheet material.

Other embodiments of the invention to that illustrated are possible. Thus the facing sheet 3 may be dispensed with and the steel shims 6 and the magnets 2 associated therewith bonded to the base sheet. Alternatively again the steel shims 6 may be dispensed with.

It will be apparent that the base sheet provides a significant amount of the damping afforded by the damping pad. Thus the base sheet may be a plastics or rubber sheet impregnated with high density particles to increase the damping characteristics thereof.

If desired the facing sheet 3 may be coated with a friction-creating material such as a latex rubber. Where this occurs the facing sheet 3 need not itself be of a material having a high coefficient of friction. For example a thick polyvinyl chloride sheet may be used, in which case the magnet-receiving pockets may be formed by heat welding. In the embodiment of the invention in which a facing sheet 3 is not employed at all, the friction-creating material may be applied direct onto the magnets 2.

While the magnets 2 have been described as flexible, it will be appreciated that rigid permanent magnets may be used provided that the complete pad remains flexible or substantially so.

It will be apparent to those skilled in the art that various modifications may be resorted to without departing from the spirit and scope of the invention as set forth in the appended claims.

I claim:

1. A method of damping vibrations in sheet material during working or handling comprising the steps of attaching a substantially flexible vibration damping pad having a vibration damping material at one face thereof to the sheet material, the pad including permanent magnet means by which the pad is releasably held to the sheet material, and the method including the step of removing said pad from said sheet material subsequent to handling or storing.

2. A method as set forth in claim 1 wherein the sheet material is a magnetically-responsive metal sheet and in which the releasable securing of the vibration damping pad is effected by magnetic attraction between it and the metal sheet.

3. A method as set forth in claim 1 wherein the sheet material is non-magnetic and in which the releasable securing of the vibration damping pad is effected by providing a mangetically-responsive backing at the side of the sheet material opposite to the vibration damping pad.

4. A flexible vibration damping pad for damping vibrations in sheet material during handling or storing comprising:
a substantially flexible vibration damping material having a face; and
permanent magnet means associated with said damping material, portions of said face being fixedly located against said permenent magnet means, said magnet means being arranged to releasably secure the vibration damping material to the sheet material during working or handling to enable the pad to be removed subsequent to said working or handling.

5. A pad as set forth in claim 4 wherein the vibration damping material is in sheet form.

6. A pad as set forth in claim 4 wherein the vibration damping material is of plastics or rubber and is impregnated with high density particles.

7. A pad as set forth in claim 4 wherein the vibration damping material is of a woven fabric having a vinyl backing.

8. A pad as set forth in claim 4 wherein the permanent magnet means comprises a plurality a magnets of a rubber or plastics material and containing ferrite particles or pieces of magnetic material.

9. A pad as set forth in claim 4 wherein the permanent magnet means comprises a plurality of rigid magnets which are so dimensioned as to afford substantial flexibility to a completed pad.

10. A pad as set forth in claim 4 wherein the permanent magnet means are bonded to the vibration damping material.

11. A pad as set forth in claim 10 when the permanent magnet means comprises a plurality of magnets, a steel shim is bonded between each magnet and the vibration damping material.

12. A pad as set forth in claim 4 wherein a facing sheet is provided which, in combination with the base sheet defines a plurality of magnet-receiving pockets in which an individual permanent magnet is disposed.

13. A pad as set forth in claim 4 wherein a friction creating material is provided to the pad on the surface thereof remote from the vibration damping material.

14. A pad as set forth in claim 13 wherein the vibration damping material is latex rubber.

15. A flexible vibration damping pad for damping vibrations in sheet material during handling or storing comprising:
a substantially flexible vibration damping material constituting a base sheet;
a facing sheet;
means securing said facing sheet at spaced intervals to the vibration damping material to define a plurality of magnet-receiving pockets; and
a plurality of individual permanent magnets adapted to fit within said magnet-receiving pockets, said magnets being arranged to releasably secure the vibration damping material to the sheet material during working or handling to enable the pad to be removed subsequent to said working or handling.

16. A flexible vibration damping pad according to claim 15 wherein said facing sheet is composed of polyvinyl chloride sheet which is secured at spaced intervals to the vibration damping material by heat welding.

17. A flexible vibration damping pad according to claim 15 wherein said facing sheet is composed of natural fibre.

* * * * *